United States Patent
Rahman (10) Patent No.: US 6,463,292 B1
(45) Date of Patent: Oct. 8, 2002

(54) SYSTEM AND METHOD FOR REDIRECTING DATA MESSAGES

(75) Inventor: Mohamed Anisur Rahman, Randolph, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/325,388

(22) Filed: Jun. 4, 1999

(51) Int. Cl.[7] ................................................. H09Q 7/20
(52) U.S. Cl. ........................................ 455/466; 455/428
(58) Field of Search ............................ 455/235.1, 466, 455/412, 413, 414, 425, 417, 457, 461, 433, 194.1, 428, 445, 566, 214, 191.3, 230, 403; 370/310, 314, 321

(56) References Cited

U.S. PATENT DOCUMENTS

| | | | | |
|---|---|---|---|---|
| 5,533,118 A | * | 7/1996 | Cesaro et al. | 379/386 |
| 5,673,266 A | * | 9/1997 | Li | 370/465 |
| 5,905,958 A | * | 5/1999 | Houde | 455/437 |
| 5,970,388 A | * | 10/1999 | Will | 455/31.2 |
| 6,006,087 A | * | 12/1999 | Amin | 455/413 |
| 6,088,596 A | * | 7/2000 | Kawakami et al. | 455/466 |
| 6,119,014 A | * | 9/2000 | Alperovich et al. | 455/466 |
| 6,125,281 A | * | 9/2000 | Wells et al. | 455/466 |
| 6,138,007 A | * | 10/2000 | Bharatia | 455/414 |
| 6,154,646 A | * | 11/2000 | Tran et al. | 455/417 |
| 6,188,887 B1 | * | 2/2001 | Joong et al. | 455/417 |
| 6,208,853 B1 | * | 3/2001 | Lo Vasco et al. | 455/414 |
| 6,208,870 B1 | * | 3/2001 | Lorello et al. | 455/466 |
| 6,249,575 B1 | * | 4/2001 | Lazaridis et al. | 709/206 |

FOREIGN PATENT DOCUMENTS

EP 0748139 A2 11/1996

OTHER PUBLICATIONS

Dynamic Adaptation in an Image Transcoding Proxy for Mobile Web Browsing, by Han et al., IEEE Personal Communications, Dec. 1998, pp. 8–17.

* cited by examiner

Primary Examiner—William Trost
Assistant Examiner—Conguan Tran
(74) Attorney, Agent, or Firm—Harness, Dickey & Pierce, P.L.C.

(57) ABSTRACT

A message redirection system includes a data protocol detector for detecting an alert message of a particular protocol received by the mobile station, a user interface manager for displaying user-interactive prompts in response to the detected alert message and accepting user input for redirecting the data message to a communications network element, and an encoder for encoding the user input into a modulating signal compatible with a communications channel.

30 Claims, 4 Drawing Sheets

SYSTEM AND METHOD FOR REDIRECTING DATA MESSAGES

FIELD OF THE INVENTION

The invention relates to wireless communication systems and more particularly to a system and method for redirecting data messages.

BACKGROUND

A wireless data server extends e-mail messaging to subscribers of a wireless system. The conventional wireless data server typically supports message notification and delivery. Although the wireless data server itself may support message redirection, mobile stations in the wireless system must be appropriately equipped to handle such message redirection. Message redirection refers to a procedure in which the wireless data server directs a data message addressed to a mobile station to another electronic destination other than the mobile station.

For GSM (Global System for Mobile Communications) mobile stations and infrastructure, message redirection is readily implemented by using the short-messaging service (SMS) feature. Manufacturers typically offer SMS as a standard or optional feature. GSM supports SMS by allocating channels, or portions thereof, for message data on an as-needed basis. Many GSM systems support both downlink and uplink transmission of SMS messages containing up to 160 alphanumeric characters. The SMS messages may be displayed on a GSM mobile station and stored on a subscriber identity module (SIM) for subsequent reference. The subscriber identity module is removable card that provides user identification and data storage for a GSM mobile station.

However, while GSM readily supports two-way SMS, most TDMA (time-division multiple access) and CDMA (code-division multiple access) systems merely support one-way SMS. In particular, many TDMA and CDMA system only support mobile-terminated SMS in which the mobile station is unable to send message redirection data to the wireless data server. Because many wireless service providers in the U.S. have embraced the TDMA/CDMA systems to a larger extent than GSM, a need exists for making message redirection compatible with a data protocol such as one-way SMS.

SUMMARY OF THE INVENTION

In accordance with the present invention, a message redirection system (or method) uses a data protocol detector for detecting an alert message of a particular data protocol received by the mobile station. A user-interface manager displays user-interactive prompts in response to a detected alert message. The user-interface manager accepts user input for redirecting a data message to a communications network element. The alert message represents notification of the existence of a data message which is addressed to the mobile station. An encoder encodes the user input as a modulating signal compatible with a communications channel.

At the mobile station, the alert message may be received as a one-way short messaging service (SMS) message, or another suitable data protocol, that is detectable by the detector. The subscriber is able to respond to the one-way SMS message, or another suitable data protocol, by entering user input which is then encoded. In one embodiment of the invention, the encoder encodes the user input into a tone signal or another signal having a modulation frequency range such that the encoded user input may be transmitted from the mobile station as if it were an ordinary voice-channel transmission. In another embodiment, the encoder provides a modulating signal suitable for transmission over a control channel or an access channel without the need to setup a voice-channel call. The message redirection system is well-suited for implementation as a software-configurable or software-upgradable feature set.

DETAILED DESCRIPTION OF THE PREFERRED EMBODIMENT

Figure 1:
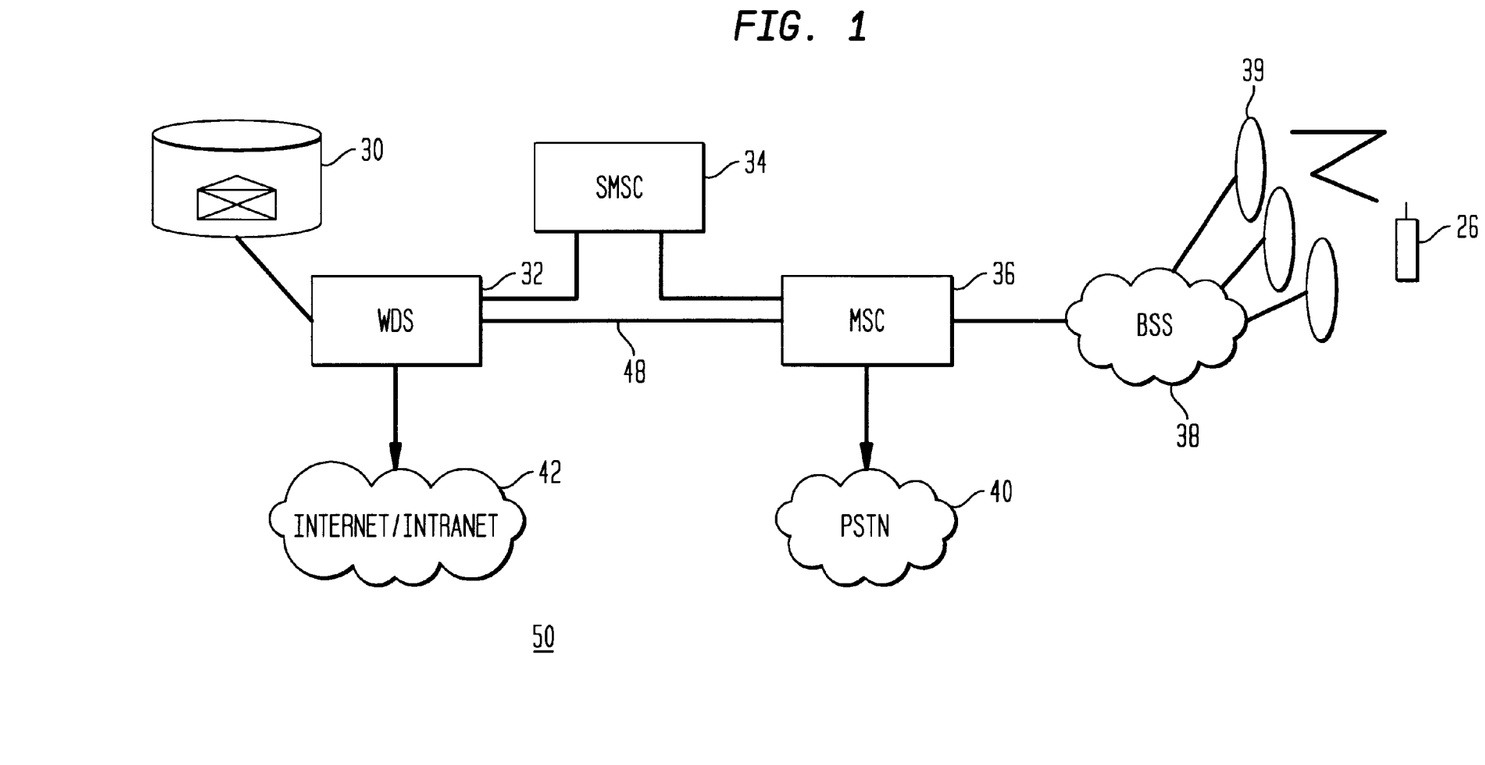
FIG. 1 shows an illustrative wireless data configuration suitable for practicing the invention.

In accordance with the invention, FIG. 1 shows a wireless communications system 50 that supports wireless data service for at least one mobile station 26. Wireless data service refers to conveying data messages to subscribers in a format compatible with their mobile stations 26, even though the data may originate in data-robust environments such as the Internet, e-mail services, or the like.

At a mobile station, an alert message provides notification of a corresponding data message that is addressed to a particular mobile station and awaiting delivery or message redirection under the direction of a wireless data server. Although an alert message may be a one-way SMS message, the alert message may conform to any other suitable data protocol. A subscriber enters user input for redirecting the data message associated with the alert message in accordance with the subscriber's preferences and technical limitations of at least one authorized data target.

A data source is a network element that is capable of providing message data to another network element or a compatible mobile station 26. A data target is a network element that is capable of receiving a data message from another network element or a data message redirected by a mobile station 26, regardless of whether the mobile station 26 itself would be capable of receiving the data message. A data source and a data target may include an e-mail server 30, a voicemail system, mailbox server, an Internet server, an intranet server, or the like.

The wireless communications system 50 includes a wireless data server 32 (WDS) that is coupled to a communications network 42 (e.g., Internet/intranet network), an e-mail server 30, a short messaging service center 34 (SMSC), and mobile switching center 36 (MSC). The SMSC 34 is interconnected to communicate directly with the MSC 36. In turn, the MSC 36 is coupled to a base station system 38, which includes one or more base stations 39 (BS) and a base station controller (BSC) 37. Each base station 39 communicates to one or more mobile stations 26 (MS) by the transmission of electromagnetic signals.

A WDS 32 includes a controller for controlling data communications with one or more mobile stations 26. The controller manages and controls the incoming data messages from mobile stations 26 and outgoing data messages to the mobile stations 26. In addition, the WDS 32 manages and controls alert messages representing outgoing data messages at the WDS 32 awaiting delivery to the mobile stations 26 or alternate network elements. An alert message indicates the presence of a corresponding outgoing message (with respect to the. WDS 32) for a particular mobile station. As an example of the operation of the WDS 32, the controller may decide to route an incoming data message from a data source to a storage mailbox for a corresponding mobile station 26 or to route an incoming data message directly from the data source to a mobile station 26 at a particular time based upon subscriber preferences and technical considerations.

The WDS 32 includes a presentation manager for presenting incoming data messages in a target data format suitable for a data target and for presenting outgoing data in a mobile data format suitable for a particular mobile station 26. For example, the presentation manager may reformat or convert outgoing textual data message into a synthesized voice message as the mobile format. The mobile format is commensurate with the technical capabilities of the mobile station 26 including, microprocessor architecture, the microprocessor instruction set, memory capacity, and software compatibility. In addition, the mobile format is consistent with data throughput limitations between the mobile station 26 and the base station 39, which may depend on the modulation scheme of the wireless communication system.

The presentation manager preferably manages a database of mobile station identifiers and associated mobile station capabilities to facilitate compliance of outgoing data messages (with respect to the WDS 32) with the applicable mobile format for a particular mobile station 26.

The presentation manager acts as an intermediary between a data target, a data source, or both and the mobile stations 26 of the wireless communications system. A data source and a data target may include an e-mail server 30, a voicemail system, mailbox server, an Internet server, an intranet server, or the like. The WDS 32 is associated with router interfaces to place data internal to the wireless data server 32 in an appropriate packet format (e.g., TCP/IP) for transmission to the communications network 42 and the e-mail server 30. In practice, the communications network 42 may comprise an intranet network, an Internet network, or a descendant network thereof.

In practice, one firewall element may be coupled between the wireless data server 32 and the communications network 42 and another firewall element may be coupled between the wireless data server 32 and the e-mail server 30 to maintain the security of the wireless communications system and the wireless data server 32. The firewalls are electronic barriers that prevent unauthorized access to the data managed or stored by the wireless data server 32. The wireless data server 32 is preferably coupled to the mobile switching center 36 over a standard digital communications line 48, such as a DS1, a fractional T1, an E1, a fractional E1, a 56 Kbp/s channel, a 64 Kbp/s channel, or a DS0.

The short messaging service center (SMSC) 34 communicates with a data source to store working copies of messages for the mobile stations 26. That is, the SMSC 34 stores recently accessed, recently modified, or newly generated data messages, alert messages, or any combination of the foregoing, to conserve and pragmatically use storage space. Accordingly, the short messaging service center 34 acts as an intelligent agent on behalf of one or more mobile stations 26 so as to avoid storing extensive amounts of information in a duplicative manner with respect to one or more data sources. In practice, the short messaging service center 34 may provide X.25 interfaces, TCP/IP interfaces, or analogous interfaces for interconnection to the wireless data server 32 and the mobile switching center 36.

The mobile switching center 36 (MSC) is a telecommunications switching office that performs switching and interconnection operations of communications trunks consistent with circuit-switching techniques. The MSC 36 provides access to the public switched telephone network 40 (PSTN). In addition, the MSC 36 services control and data signaling needs for control of the base station system 38 and mobile stations 26. A base station controller (not shown) of the base station system 38 is coupled to one or more base stations 39 and controls the channel assignments and access to the wireless communications system under the governance of the MSC 36.

The MSC 36 is coupled to a public switched telephone network 40 (PSTN) to provide the wireless data server 32, the mobile station 26, or both access to the PSTN 40. Access to the PSTN 40 allows the mobile station 26 to make and receive telephone calls, and permits redirection of telephone calls or fax data to other network elements, such as voice mailboxes, telephones, facsimile machines or the like. The wireless system 50 of FIG. 1 supports one-way SMS messages, telocator application protocol (TAP), a paging protocol, or another data transmission protocol. TAP is a prevalent paging protocol that is well-suited for one-way or mobile terminated data calls, which include mobile identifier and a textual message.

The base station system 38 includes one or more base stations 39 with decoders corresponding to the encoders used in the mobile stations 26. The decoders are adapted to decode a user input from a modulating signal transmitted via a communications channel between a mobile station 26 and a corresponding base station 39. The decoder may comprise a tone decoder, a dual-tone multiple-frequency decoder, a single tone decoder, a pulse code decoder, a pulse width decoder, a pulse amplitude decoder, or any other suitable decoding device.

The base station system 38 is capable of receiving a message redirection request from a mobile station 26 as if it were an ordinary voice transmission over the particular wireless system or over a control channel to avoid setting up a voice call. Accordingly, a downlink transmission may be supported by one-way short-messaging service (SMS), while an associated uplink transmission is supported over an ordinary voice channel to facilitate compatibility with various CDMA and TDMA wireless systems, regardless of the manufacturer of the equipment or proprietary data transmissions.

Figure 2:
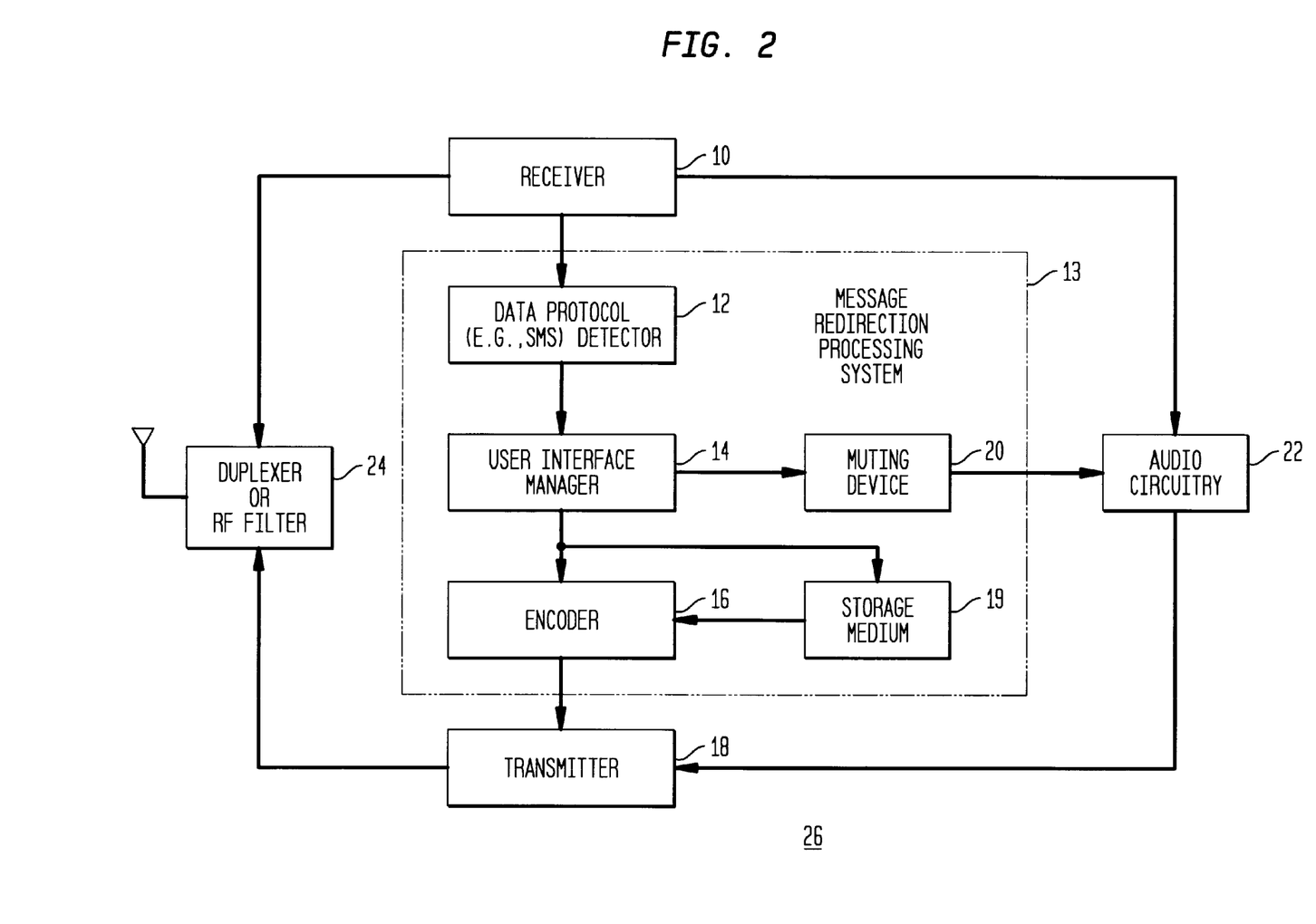
FIG. 2 shows a block diagram of a mobile station incorporating an embodiment of the message redirection processing system in accordance with the invention.

FIG. 2 shows a mobile station 26 equipped with a message redirection system 13 in accordance with the invention. The message redirection system 13 includes a data protocol detector 12 arranged to communicate with a user-interface manager 14 and an encoder 16 arranged to communicate with the user-interface manager 14. A muting device 20 and a storage medium 19 act under the direction of the user interface manager 14. The mobile station 26 includes a receiver 10 and a transmitter 18 that cooperate with a duplexer 24 or radio frequency (or microwave) filter to facilitate duplex operation of the mobile station 26. The receiver 10 and the transmitter 18 are coupled to audio circuitry 22 which includes both a speaker and a transducer (e.g., microphone) for the subscriber.

Generally, the data protocol detector 12 detects an alert message of a particular data protocol received by a mobile station 26. The data protocol detector 12 detects an alert message of a first data protocol, while the encoder encodes an alert response message to comply with a second data protocol distinct from the first data protocol. The second data protocol may be a tone-signaling data protocol suitable for transmission over a voice channel or a data protocol based on TDMA or CDMA signaling standards of a control channel or an access channel. The data protocol detector 12 is preferably capable of detecting an SMS message as the particular data protocol. If the detector 12 detects a particular data protocol the detector 12 sends an alert signal to the user-interface manager 14.

Upon receipt of the alert signal from the data protocol detector 12, the user-interface manager 14 provides one or more user-interactive prompts for redirecting the detected data message in accordance with a user preference or selection entered via the user interface 15. The alert message acts as a trigger for the user-interactive prompt. The user-interactive prompt may comprise a set of alphanumeric characters that is displayable on a display of the mobile station 26.

The user-interactive prompts are generated or derived predominately from mobile data that is locally stored at each mobile station to conserve bandwidth use and battery power. The alert message may augment or supplement the mobile data to form the user-interactive prompt which is tailored to each subscriber's configuration or preferences. Thus, the formation of user-interactive prompt with minimal communications traffic between the mobile station 26 and the base station 39 is well-suited for meeting the challenges of wireless networks with rampant transmissions of e-mail messages or advertisements, which might otherwise bog-down the wireless network.

In alternate embodiments, the user interactive prompt may comprise a symbol that is displayable the display, a displayable image for the display, or a voice message generated by a wireless data server 32 and playable by the mobile station 26.

The user interface 15 may comprise a keypad of the mobile station 26, an electrical switch, a virtual switch, a touch-screen activated switch, a menu-driven display, or the like on the mobile station 26. The user interface manager 14 may provide a menu or a group of choices that a user may select via the user interface to redirect the data message (represented by the alert message) to a communications data target. The user input is conveyed to the WDS 32 as an alert response message in reply to the alert message previously sent. The alert response message contains message control information or message redirection information such as a data target identifier or address. The alert response message is represented by (or derived from) the modulating signal suited for application to a modulator in the transmitter of the mobile station 26. The communications data target may include any network element that the wireless data server 32 supports via its presentation manager. The presentation manager is adapted to present incoming data messages in a target data format suitable for a data target and for presenting outgoing data in a mobile data format suitable for a particular mobile station.

In an alternate embodiment, the user interface comprises a voice recognition system for recognizing human voice commands after at least one training recitation of sample voice commands.

In one embodiment, the encoder 16 encodes the user input into a modulating signal consistent with uplink transmission as if the user input were a voice message spoken by the subscriber into the transducer during a voice call. Accordingly, upon receipt of the alert message the mobile station may automatically setup a voice channel call for subsequent transmission of the modulated signal. To setup a voice channel, a data channel, or another traffic channel for the modulating signal, the mobile station transmits a request via a control channel, an access channel, or a suitable overhead channel. The request for channel access needs to substantially comply with authentication procedures, hand-shaking procedures, data protocol, and any other applicable signaling requirements. Because the modulating signal is compatible for transmission over a voice channel of the wireless network, the system and method is well-suited for implementation on commercially available mobile stations without elaborate software or hardware changes. Moreover, a voice-channel compatible signal represents a universally applicable standard that is readily transferable to CMDA or TDMA, regardless of their underlying modulation and control schemes of their data channels, access channels, overhead channels, or control channels.

In the voice-channel compatible embodiment, the encoder 16 encodes the user input into a tone signal or another signal having a modulation frequency or frequency range compatible with a voice bandwidth allocated on a wireless communications channel. The tone signal may comprise a single tone signal, a dual-tone signal, a dual-tone multiple frequency signal, a sub-audible frequency signal, an audible frequency signal, a proxy for a DTMF signal, or the like. The modulated signal is compatible with the voice channel transmission if the modulated signal generally lies within a frequency range from greater than 0 Hertz to 3 Kilohertz (or higher for certain wireless communications systems) and if the modulated signal has amplitude commensurate with that of an ordinary voice call modulated by human subscriber speaking into the transducer of the mobile station 26.

A proxy for a DTMF signal refers to any data transmitted over the air interface between the mobile station 26 and the base station 39 which is intended to represent a user pressing certain keys on an actual or virtual keypad of the mobile station 26. An actual keypad is a physical keypad including physical switches, whereas a virtual keypad comprises a voice recognition interface, a touch screen display, or the like.

The voice-compatible modulated signal may comprise tones within the audio frequency range that are readily regenerated for error correction by repetition of transmission from the mobile station 26 to the base station 39 upon receipt of a repeat command via an SMS data message, an alert message, or the like. To this end, the user-interface manager 14 automatically and dynamically stores entered user input on a storage medium 19. Upon receipt of a repeat command to resend the previously entered user input, the user-interface manager 14 accesses the stored user input on the storage medium 19. The encoder 16 uses the stored user input to regenerate a duplicate modulated signal of the previously entered user input. The transmitter 18 retransmits the user input as the duplicate modulated signal after or during regeneration to enhance the reliability of a subscriber's message redirection transmission from the mobile station.

The storage medium 19 may comprise nonvolatile memory such as electronically erasable programmable random access memory (EEPROM), a periodically refreshed random access memory energized even when the mobile station is "off", or the like. In certain cases, an adequate storage medium 19 is already present in a mobile station in the form of a speed-dial setting or phone number memory. Accordingly, the software instructions of the present invention may steal or borrow a segment of the phone number memory for dedicated use in repeating user input from the mobile station 26 to the base station 39 to increase signaling reliability.

In one embodiment, the mobile station 26 further includes a muting device 20. The muting device 20 mutes any audio input into the mobile station 26 from the user during the time interval when the user input or alert response message on message redirection is transmitted from the mobile station 26. The muting device 20 generally allows the receipt of voice prompts, acknowledgments, or instructions to assist the user during the time interval when the alert response message on message redirection is transmitted, or thereafter. However, the muting device 20 may mute any sidetone which is incidentally generated by the transmission of the alert response message to avoid annoying the subscriber who may otherwise hear an attenuated voice tone being transmitted to the base station 39. A sidetone represents a feedback of a sound from the audio circuitry 22 associated with the transmitter 18 to a receive speaker of the mobile station 26.

Although the encoder may encode the user input as a modulating signal consistent with uplink transmission on a voice channel, in an alternate embodiment the modulating signal is sent via a data channel, an access channel, a control channel, an overhead channel, or the like. If a control channel or a channel other than a voice channel is used, an alternate encoder provides a modulating signal as pulse-modulation, pulse-code modulation, pulse-width modulation, pulse-frequency modulation, pulse-amplitude modulation, or any other suitable digital signal. The modulating signal is adjusted before application to the modulator of the mobile station for purposes of error reduction, bit interleaving, ciphering, data protocol conformance, or other data manipulation to conform to a CDMA signaling scheme, a TDMA signaling scheme, or the like. By using a control channel or an access channel to transmit the alert response message, no voice-channel setup sequence is required; hence, transmission over the air interface may be virtually immediate. An access channel is a control channel over which a mobile station seeks access to the wireless communication systems or the assignment of a traffic channel for the mobile station's use. A control channel has a broader definition than an access channel. The control channel includes a channel for transmitting any overhead, pilot, paging, control or communications management data between one or more mobile stations and the base station.

Figure 3:
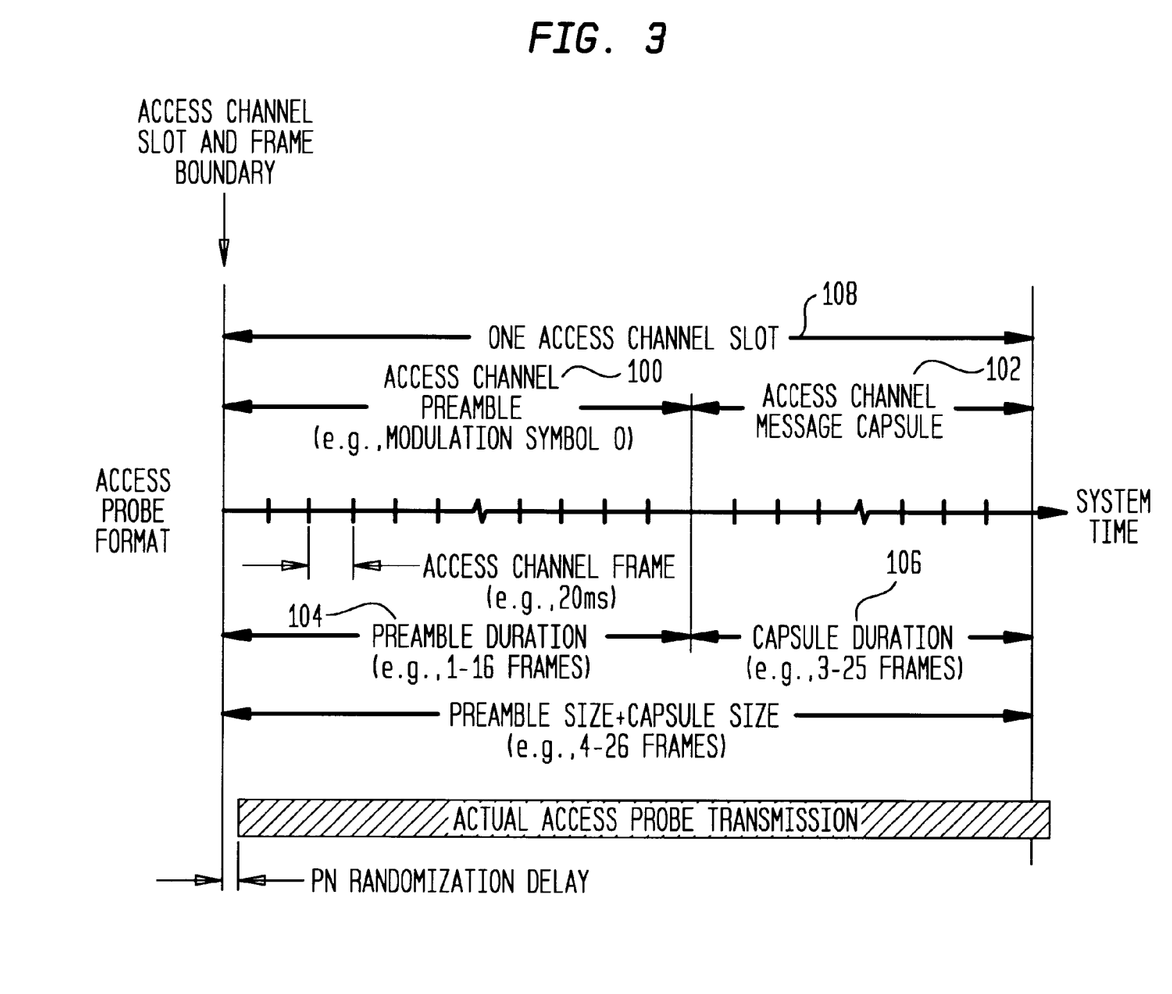
FIG. 3 shows an alert message response on an access channel in accordance with the invention.

FIG. 3 illustrates an alert response message which is compatible with transmission over an access channel of a wireless communications system (e.g., Time-Division Multiple-Access (TDMA) or Code-Division Multiple-Access (CDMA) wireless system) in accordance with the invention. The North American code-division multiple-access (CDMA) personal communications services standard (PCS) standard NC 0008 or the CDMA cellular standard IS-95B generally supports an access request message and an access response message over an access channel. The mobile station autonomously generates an access request message over an access channel to request access to a wireless system, while the mobile station responds to the base station over the access channel with access information via an access response. Accordingly, the alert response message may be modeled based upon the access request message, the access response message, or a similar type of message compatible with the access channel of a wireless communications system.

As shown in FIG. 3, the alert response message includes an access channel preamble 100 and an access channel message capsule 102. The access channel preamble 100 allows a received alert message from the mobile station to be synchronized with a demodulation signal (not shown) from the mobile station for proper demodulation and decoding at the base station receiver. The message capsule 102 may contain information encoded in response to user-interactive prompts at the mobile station.

The access channel preamble 100 and the access channel message capsule 102 have a preamble duration 104 and a capsule duration 106, respectively. The sum of the preamble duration 104 and the capsule duration 106 fills one access channel time slot 108. For convenience, the preamble duration and the capsule duration may be measured by the number of frames they occupy.

An alert response message may represent a transmission packet (e.g., probe) within a sequence of transmission packets with identical underlying data. Further, if the base station does not acknowledge receipt of at least one transmission packet within the sequence, the mobile station may transmit another sequence of transmission packets with the identical underlying data to improve communications reliability. The maximum number of the transmission packets and the maximum number of the sequences may be tailored or otherwise adjusted to provide adequate throughput and reliability for the alert response message, as opposed to a conventional access request or a access response over the access channel.

The message capsule 102 includes communication parameters that the mobile station uses in transmitting over the access channel to the base station. The communication parameters may be expressed as fields. The fields may be classified as layer 2 or layer 3 fields. Layer 3 data includes application-program data. Layer 3 data interacts with Layer 2 data for managing data link protocol, and Layer 1 which represents the physical layer.

The alert response message contains, or otherwise supports, a message-type field. The alert response message is distinguished from an access message, a response message, or other messages by a message-type indicator in the message-type field. The massage-type field enables any collection of operational statistics concerning the standard request message and the standard access message to retain their accuracy despite the introduction of the alert response message. Further, each unique message type can have different communication parameters associated with the message-type indicator.

A maximum capsule size field of the alert response message may be increased by the number of frames not required for reliable synchronization of the preamble. Accordingly, the maximum preamble size is reduced proportionally to increase the maximum capsule size. The maximum preamble size may be reduced to as little as one frame where the electromagnetic or radio frequency coverage between the mobile station and the base station so permits.

In one embodiment, the maximum preamble size may be dynamically configured based on a signal-to-noise measurement or another signal parameter measurement of the downlink or uplink signal within a geographic coverage area. Accordingly, the higher the signal-to-noise ratio, the smaller the size of the maximum preamble size. The relationship between the signal parameter measurement and the maximum preamble size may be recorded in a look-up table stored in the mobile station.

The overall duration of the access channel time slot 108 may remain constant as the maximum capsule size and the maximum preamble size are changed inversely with respect to each other. In the context of the above-referenced CDMA standards, for example, the maximum capsule size may be increased from 10 frames up to 25 frames to permit user-definable data messages of greater size to be transmitted as an alert response message consistent with the overall duration of the access channel time slot. Accordingly, the data throughput for the alert response message may be maximized consistent with the framework (e.g., access channel time slot) provided by the wireless communications system.

The alert response contains an authentication field or another field for supporting a mobile identifier or mobile identifier code. The mobile identifier code facilitates distinguishing the transmission of the alert response message of a particular mobile station from all other mobile stations.

The alert response message includes a maximum repetition number field and a maximum packet number field for specifying the maximum number of repetitions for enhancing reliability. The maximum repetition number for transmission packets and the maximum repetition number of sequences of the alert response message are optimized or otherwise adjusted to achieve appropriate reliability and data throughput of one or more alert response messages on the access channel. The maximum repetition numbers for the alert response message and any associated counters are distinguishable from the maximum repetition numbers for access probes and access sequences associated with any access messages and any response message over the access channel. A counter is incremented or a flag updated for each additional transmission packet or each additional sequence of access channel response messages.

Figure 4:
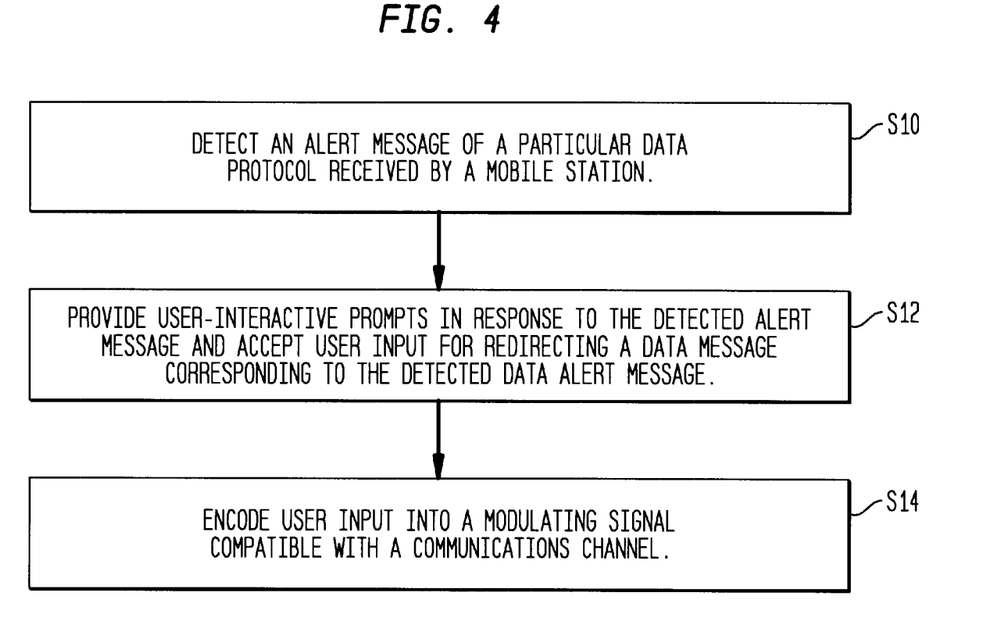
FIG. 4 shows a flow chart of a method of redirecting messages in accordance with the invention.

In FIG. 4, a method for redirecting a data message for a mobile station 26 starts with step S10. In step S10, a detector 12 detects an alert message of a particular data protocol received by the mobile station 26. For example, the alert message of the particular data protocol may comprise a short message service (SMS) message.

Following step S10, in step S12 the user-interface manager 14 provides user-interactive prompts in response to receipt of the alert message and accepts user input for redirecting a data message (represented by the alert message) to a communications network element. The user-interactive prompt may be a set of alphanumeric characters for displaying on a display of the mobile station 26.

Alternately, the user interactive prompt constitutes a voice message in a format playable, or otherwise renderable, by the mobile station 26. To enhance reliability of the transmission of user data, the user input data may be stored in the storage medium 19. For example, the user-input data manager 14 can store the user input data as a programmable dialing combination for resending upon the decoder's receipt of a SMS message requesting a resend of the user input data.

In step S14, the encoder 16 encodes the user input into a modulating signal that is compatible with a communications channel between a mobile station 26 and a corresponding base station 39. The user input provides information to the wireless data server 32 on the direction, redirection, or control of the data message under the dominion of the wireless data server 32. For example, the encoding procedure may transform a subscriber's key presses of a key pad, or another user interface, into a modulating signal compatible with transmission over a voice-channel of a wireless communications system. Suitable modulation signal schemes include a single tone signal, dual tone signal, a dual-tone multiple access signal, a sub-audible frequency signal, an audible frequency signal, among others. The modulated signal, for example, may have a modulation frequency within a range from greater than 0 Hertz to at least 3 Kilohertz. In an alternate embodiment, an alternate encoder encodes a modulating signal as pulse modulation or another digital format suitable for transmission over a control channel or an access channel of a wireless communications system.

An additional step may follow step S14. The additional step includes muting audio input into a transducer of the mobile station 26 to prevent interference with the transmission of a modulating signal compatible with transmission over a voice-channel. The additional step may further include muting a sidetone at a speaker of the mobile station 26 to prevent a subscriber from hearing a tone of a modulating signal during transmission of the user input data or as an alert response message conveyed via a modulated tone signal. This specification describes various illustrative embodiments of the system and method of the present invention. The scope of the claims is intended to cover various modifications and equivalent arrangements of the illustrative embodiments disclosed in the specification. Therefore, the following claims should be accorded the reasonably broadest interpretations to cover the modifications, equivalent structures, and features which are consistent with the spirit and scope of the invention disclosed herein.

I claim:

1. A message redirection system for a mobile station, the system comprising:
   a data protocol detector for detecting an alert message of a data protocol received by the mobile station;
   a user interface manager for providing user-interactive prompts in response to the detected alert message and accepting user input for redirecting a data message that corresponds to the alert message; and
   an encoder for encoding the user input into a modulating signal used as an alert response message corresponding to the redirected data message, said encoder including a control channel that transmits the alert response message to communications network elements, including to communications network elements other than the communication network element from which the original alert message was received.

2. The system according to claim 1 further comprising:
   a storage medium for storing the accepted user input to facilitate repetitious transmission of the user input from the mobile station to a base station.

3. The system according to claim 2 wherein the storage medium comprises at least a segment of a phone-number memory arranged to communicate with the user interface manager so as to dynamically and automatically store accepted user input.

4. The system according to claim 1 further comprising:
   an audio circuit for accepting audio input at a transducer;
   a muting device for muting the audio input at the transducer during a time interval when the user input is transmitted, the muting device coupled to the audio circuit and the user interface manager.

5. The system according to claim 1 further comprising:
   an audio circuit having a speaker for providing audio output;
   a muting device for muting any sidetone audio associated with the audio output and resulting from a feedback transmission path between the user input and the speaker, the muting device coupled to the audio circuit and the user interface manager.

6. The system according to claim 1 wherein the data protocol detector comprises a detector for detecting short message service data as the alert message of the particular data protocol.

7. The system according to claim 1 wherein the modulating signal is selected from a group of voice-channel compatible signals consisting of a single tone signal, dual tone signal, a dual-tone multiple frequency signal, a sub-audible frequency signal, and an audible frequency signal.

8. The system according to claim 1 wherein the user-interactive prompt comprises a voice message generated by a wireless data server.

9. The system according to claim 1 wherein the user interactive prompt comprises a set of alphanumeric characters that is displayable one a display of the mobile station.

10. The system according to claim 1, wherein the control channel enables the alert response message to be immediately transmitted without initiating a voice-channel setup sequence in advance.

11. A message redirection system for a mobile station, the system comprising:
    a data protocol detector for detecting an alert message of a first data protocol received by the mobile station;
    a user interface manager for providing user-interactive prompts in response to the detected alert message and accepting user input for redirecting a data message that corresponds to the alert message; and
    an encoder for encoding the user input into a alert response message having a second data protocol distinct from the first data protocol, said encoder including a control channel that transmits the alert response message to communications network elements, including to communications network elements other than the communication network element from which the original alert message of the first data protocol was received.

12. The system according to claim 11 wherein the first data protocol is consistent with data signaling of a short messaging service and wherein the second data protocol is consistent with data signaling of an access channel of a time-division multiple access system.

13. The system according to claim 11 wherein the first data protocol is consistent with data signaling of a short messaging service and wherein the second data protocol is consistent with data signaling of an access channel of a code-division multiple-access system.

14. The system according to claim 11 wherein the encoder is adapted to transmit the alert message response over an access channel as the control channel, the alert message including a message preamble having a preamble size and a message capsule having a capsule size maximized by a commensurate reduction in the preamble size consistent with reliable synchronization and maintenance of a constant duration for a time slot of the access channel.

15. The system according to claim 11 wherein the control channel comprises an access channel and wherein the alert response message includes a message-type field with an indicator for distinguishing the alert message response from any access message and any response message transmitted over the access channel.

16. The system according to claim 11 wherein the control channel comprises an access channel and wherein the encoder is adapted to transmit an alert message response having a preamble with a preamble size and a message capsule with a capsule size, the preamble size being dynamically determined based upon a signal parameter measurement for a mobile station within a geographic coverage area.

17. The system according to claim 11 wherein the user-interactive prompt comprises a voice message generated by a wireless data server.

18. The system according to claim 11 wherein the user interactive prompt comprises a set of alphanumeric characters that is displayable on a display of the mobile station.

19. The system according to claim 11, wherein the control channel enables the alert response message to be immediately transmitted without initiating a voice-channel setup sequence in advance.

20. A method for redirecting a data message for a mobile station, the method comprising:
    detecting an alert message of a particular data protocol received by the mobile station;
    providing user-interactive prompts derivable predominately at the mobile station in response to the detected alert message and accepting user input for redirecting a data message, corresponding to the alert message, to a communications network element; and
    encoding the user input into a modulating signal compatible with a communications channel.

21. The method according to claim 20 wherein the detecting step comprises detecting short message service data as the alert message of the particular data protocol.

22. The method according to claim 20 wherein the encoding step comprises modulating the user input as a voice-channel compatible modulating signal selected from a group consisting of a single tone signal, dual tone signal, a dual-tone multiple access signal, a sub-audible frequency signal, and an audible frequency signal.

23. The method according to claim 20 wherein the encoding step comprises modulating the user input as a control-channel compatible modulating signal selected from a group consisting of a pulse signal, a pulse code modulation signal, a pulse width modulation signal, a pulse frequency modulation signal, and a pulse amplitude modulation signal.

24. The method according to claim 20 wherein the providing step includes a voice message as the user-interactive prompt.

25. The method according to claim 20 wherein the providing step includes a set of alphanumeric characters, for a display of the mobile station, as the user-interactive prompt.

26. The method according to claim 20 further comprising the step of:
    muting audio user input to a transmitter of the mobile station to prevent interference with the transmission of the modulating signal.

27. The method according to claim 20 further comprising the step of:
    muting a sidetone within audio circuitry of the mobile station to prevent a user from hearing the voice-channel compatible format during transmission of the modulating signal.

28. The method according to claim 20 further comprising the step of:
    storing the user input data as a programmable dialing combination for resending upon receipt of an SMS message requesting a resend of the user input data.

29. The system according to claim 1, wherein said encoder is configured so that upon receipt of the alert message the control channel enables automatic or dynamic availability of a voice channel for subsequent transmission of the alert response message.

30. The system according to claim 11, wherein said encoder is configured so that upon receipt of the alert message the control channel enables automatic or dynamic availability of a voice channel for subsequent transmission of the alert response message.

* * * * *